United States Patent
Jung et al.

(10) Patent No.: US 9,569,067 B2
(45) Date of Patent: Feb. 14, 2017

(54) MOBILE TERMINAL AND CONTROL METHOD THEREOF

(71) Applicant: LG ELECTRONICS INC., Seoul (KR)

(72) Inventors: Hayang Jung, Seoul (KR); Greg Jang, Seoul (KR); Jiyoung Park, Anseong (KR); Sujin Kim, Busan (KR)

(73) Assignee: LG ELECTRONICS INC., Seoul (KR)

(*) Notice: Subject to any disclaimer, the term of this patent is extended or adjusted under 35 U.S.C. 154(b) by 355 days.

(21) Appl. No.: 13/782,169

(22) Filed: Mar. 1, 2013

(65) Prior Publication Data

US 2014/0063053 A1    Mar. 6, 2014

(30) Foreign Application Priority Data

Aug. 28, 2012 (KR) .................. 10-2012-0094514

(51) Int. Cl.
G06F 3/0481 (2013.01)
H04M 1/2745 (2006.01)
G06Q 10/10 (2012.01)

(52) U.S. Cl.
CPC .......... *G06F 3/04817* (2013.01); *G06Q 10/10* (2013.01); *H04M 1/274508* (2013.01); *H04M 1/274533* (2013.01); H04M 1/274525 (2013.01)

(58) Field of Classification Search
None
See application file for complete search history.

(56) References Cited

U.S. PATENT DOCUMENTS

| | | | | |
|---|---|---|---|---|
| 2004/0119755 | A1* | 6/2004 | Guibourge | G06F 3/0482 715/827 |
| 2005/0091272 | A1* | 4/2005 | Smith et al. | 707/104.1 |
| 2009/0023472 | A1* | 1/2009 | Yoo et al. | 455/556.1 |
| 2009/0144661 | A1* | 6/2009 | Nakajima | G06F 3/048 715/835 |
| 2009/0210810 | A1* | 8/2009 | Ryu et al. | 715/769 |

(Continued)

FOREIGN PATENT DOCUMENTS

CN    102279948 A    12/2011
EP    1 069 749 A1    1/2001

OTHER PUBLICATIONS

SPRINT (Palm Pre Phone User Guide; Jan. 1, 2009, p. 1-344, provided in applicant's IDS.*

(Continued)

*Primary Examiner* — Xiao Wu
*Assistant Examiner* — Yu Chen
(74) *Attorney, Agent, or Firm* — KED & Associates, LLP

(57) ABSTRACT

A mobile terminal for displaying a contact item and a control method thereof are provided. The mobile terminal includes: a display unit configured to display a plurality of contact items; a controller configured to designate a selected contact item as a representative contact item when any one of the contact items is selected, and designate a selected different contact item as a subordinate contact item when the different contact item is selected from among the contact items, and merge contact information corresponding to the subordinate contact item into contact information corresponding to the representative contact item when a control command for merging contact information is detected, wherein the controller disposes the subordinate contact item such that it is adjacent to the representative contact item.

20 Claims, 16 Drawing Sheets

(56) References Cited

U.S. PATENT DOCUMENTS

| | | | |
|---|---|---|---|
| 2010/0150407 A1* | 6/2010 | Cheswick | 382/118 |
| 2011/0145099 A1 | 6/2011 | Berger et al. | 705/27.1 |
| 2011/0197163 A1 | 8/2011 | Jegal et al. | 715/811 |
| 2011/0307455 A1* | 12/2011 | Gupta et al. | 707/692 |
| 2013/0203468 A1* | 8/2013 | Weng | H04M 1/274533 455/564 |

OTHER PUBLICATIONS

SPRINT: "Palm Pre Phone User Guide"; Jan. 1, 2009, pp. 1-344, <http://www.hpwebos.com/us/supportihandbooks/pre/p100eww/PalmPre_UG_Sprint_p1 O0eww.pdf>; retrieved from Internet on Feb. 14, 2014 (XP002669579).
European Search Report dated Dec. 3, 2013 issued in Application No. 13 00 1044.
Chinese Office Action dated Jan. 12, 2015 issued in Application No. 201310084354.4.

\* cited by examiner

MOBILE TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2012-0094514, filed on Aug. 28, 2012, the contents of which are hereby incorporated by reference in their entirety.

BACKGROUND

Field of the Invention

The present invention relates to a mobile terminal and, more particularly, to a mobile terminal capable of displaying a contact item and a control method thereof.

Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

On the strength of the improvement, a terminal may display contact items. Here, the terminal may display a plurality of contact items of the same counterpart (i.e., the same person). In this case, the terminal may display all of a contact item including a phone number, a contact item including a social networking service address, and a contact item including a mail address. However, if contact items of the same counterpart, among a plurality of contact items displayed on the display unit, are dispersedly disposed, a user cannot easily view the contact items of the same counterpart at a glance.

SUMMARY

An aspect of the present invention provides a mobile terminal capable of effectively displaying a plurality of contact items and a control method thereof.

To achieve these and other advantages and in accordance with the purpose of the present invention, as embodied and broadly described herein, the present invention provides in one aspect a mobile terminal including: a display unit configured to display a plurality of contact items; a controller configured to designate a selected contact item as a representative contact item when any one of the contact items is selected, and designate a selected different contact item as a subordinate contact item when the different contact item is selected from among the contact items, and merge contact information corresponding to the subordinate contact item into contact information corresponding to the representative contact item when a control command for merging contact information is detected, wherein the controller disposes the subordinate contact item such that it is adjacent to the representative contact item.

In an embodiment, the controller may control the subordinate contact item cooperatively according to control of the representative contact item.

In an embodiment, when the representative contact item is designated, the controller may divide the display unit into a first screen region and a second screen region, display the representative contact item in the first screen region, and display the plurality of contact items in the second screen region.

In an embodiment, when the representative contact item is designated, the controller may display an indicator indicating the representative contact item together with the representative contact item.

In an embodiment, when the subordinate contact item is designated, the controller may display the subordinate contact item in a lower side of the representative contact item displayed in the first screen region.

In an embodiment, when the contact information corresponding to the subordinate contact item is merged into the contact information corresponding to the representative contact item, the controller may make the subordinate contact item disappear.

In an embodiment, the controller may display an icon indicating the number of subordinate contact items subordinate to the representative contact item together with the representative contact item, and when the icon is selected, the controller may display the subordinate contact items subordinate to the representative contact item on the display unit.

In an embodiment, the controller may generate a group including the representative contact item and the subordinate contact items subordinate to the representative contact item, and designate again a representative contact item among contact items included in the generated group based on a touch input applied to the display unit.

In an embodiment, the controller may display an icon corresponding to the generated group on a wall paper, and when a touch input applied to the icon is sensed, the controller may display at least one of contact information corresponding to the representative contact item and contact information corresponding to the subordinate contact items on the display unit based on attribute information of the sensed touch input.

In an embodiment, the controller may extract contact items in relation to the contact information from the plurality of contact items by using the contact information corresponding to the representative contact item, display the extracted contact items on the display unit, and designate a contact item selected from among the extracted contact items, as the subordinate contact item with respect to the representative contact item.

In an embodiment, when a touch input with respect to the representative contact item is sensed, the controller may display a pop-up window including the extracted contact items on the display unit.

In an embodiment, the mobile terminal may further include a detection unit configured to detect a representative face image from image information corresponding to the representative contact item, and detect face images from image information corresponding to each of the plurality of contact items, and the controller may compare the detected representative face image and the face images to extract a contact item having a face image corresponding to the representative face image from the plurality of contact items.

In an embodiment, the controller may divide the plurality of contact items into a plurality of groups by using contact information corresponding to each of the plurality of contact items, and discriminately display the plurality of groups on the display unit.

In an embodiment, when any one of contact items included in a group among the plurality of groups is selected, the controller may designate the selected contact item as a representative contact item, and in a state in which the representative contact item is designated, when a different contact item is selected from among contact items included in the group, the controller may designate the selected different contact item as a subordinate contact item with respect to the representative item.

In an embodiment, when a touch input applied to the contact items included in the group is sensed, the controller may detect attribute information of the sensed touch input and designate the touched contact item as any one of the representative contact item and the subordinate contact item.

In an embodiment, when a control command for adding a new contact item is sensed, the controller may extract contact items in relation to contact information corresponding to the contact item to be added from the plurality of contact items by using the contact information, and display the extracted contact items on the display unit.

In an embodiment, when any one of the extracted contact items is selected, the controller may merge contact information corresponding to the contact item to be added into contact information corresponding to the selected contact item.

To achieve these and other advantages and in accordance with the purpose of the present invention, as embodied and broadly described herein, the present invention provides in another aspect a control method of a mobile terminal including a display unit configured to display a plurality of contact items. The control method of mobile terminal includes: when any one of contact items is selected, designating the selected contact item as a representative contact item; when a different contact item among the contact items is selected, designating the selected different contact item as a subordinate contact item with respect to the representative contact item; disposing the subordinate contact item such that it is adjacent to the representative contact item; and when a control command for merging the contact information is sensed, merging contact information corresponding to the subordinate contact item into contact information corresponding to the representative contact item.

In an embodiment, the control method of a mobile terminal may further include: controlling the subordinate contact item when the representative contact item is controlled.

In an embodiment, the designating of the selected contact item as a representative contact item may include: when the representative contact item is designated, dividing the display unit into first and second screen regions; and displaying the representative contact item in the first screen region and displaying the plurality of contact items in the second screen region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION

Reference will now be made in detail to the preferred embodiments of the present invention, examples of which are illustrated in the accompanying drawings.

Figure 1:
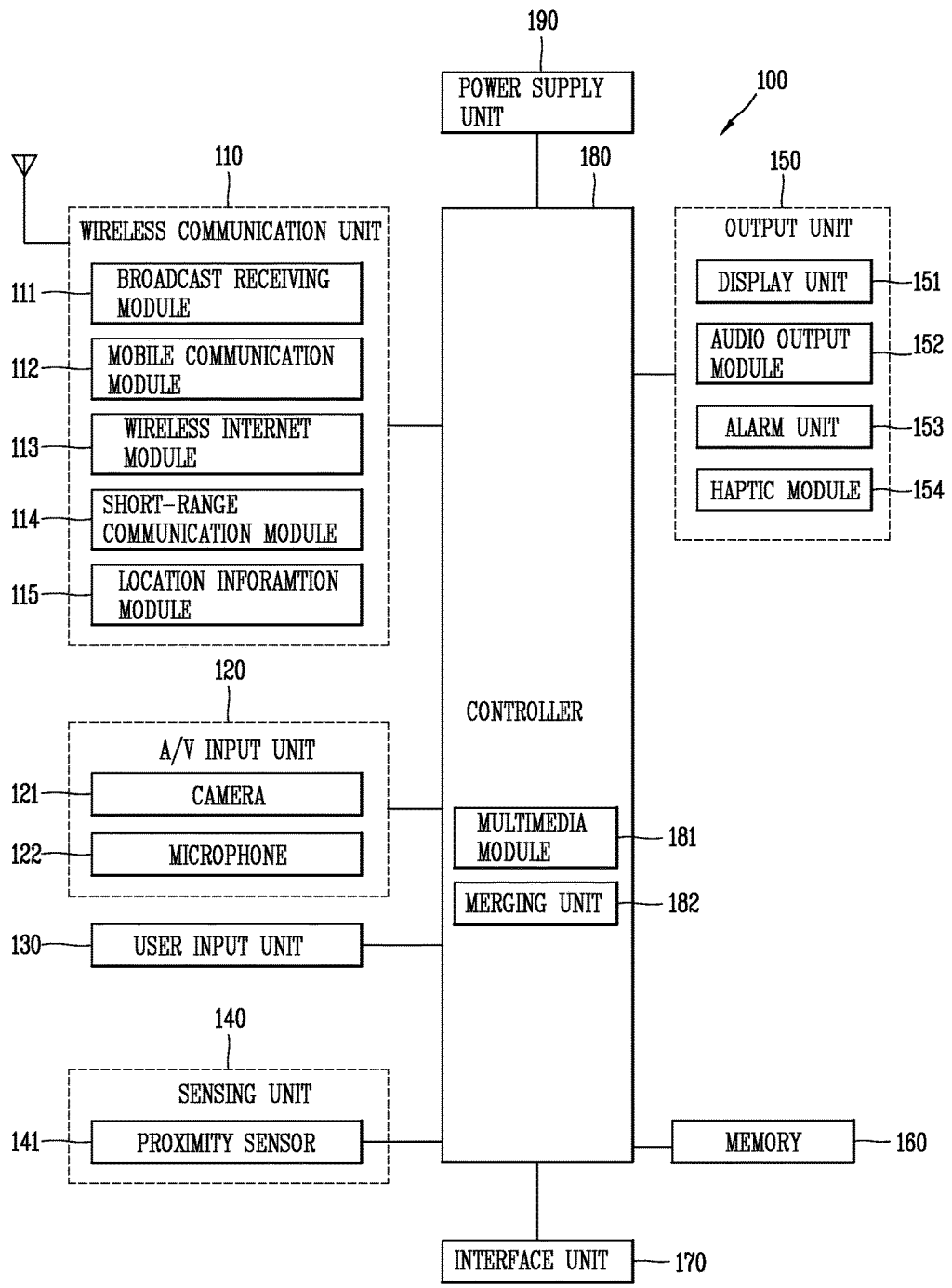
FIG. 1 is a block diagram of a mobile terminal according to an embodiment of the present invention.

FIG. 1 is a block diagram of a mobile terminal 100 according to an embodiment of the present invention. With reference to FIG. 1, the mobile terminal 100 includes a wireless communication unit 110, an A/V (Audio/Video) input unit (referred to as a 'user tracking unit', hereinafter) 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

Hereinafter, the elements 110 to 190 of the mobile terminal 100 will be described in detail as follows.

The wireless communication unit 110 typically includes one or more modules allowing for radio communication between the mobile terminal 100 and a wireless communication system or between the mobile terminal 100 and a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal, and a server. Such radio signals may include a voice call signal, a video call signal or various types of data according to text and/or multimedia message transmission and/or reception.

The wireless Internet module 113 supports wireless Internet access for the mobile terminal 100. This module may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal 100. A typical example of the location information module is a GPS (Global Positioning System).

With reference to FIG. 1, the A/V input unit 120 may include a camera 121 and a microphone 122. The camera 121 processes image frames of still pictures or video obtained by an image sensor in a video capturing mode or an image capturing mode. The image frames processed by the camera 121 may be displayed on a display unit 151. The processed image frames may be stored in the memory 160 or transmitted to the outside via the wireless communication unit 110. Two or more cameras 121 may be provided according to a usage environment.

The microphone 122 may process an audio signal input from an external source into electrical voice data in a phone call mode, a recording mode, a voice recognition mode, and the like. The audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. Also, the sensing unit 140 may include a touch sensor (not shown) for sensing a touch operation with respect to the display unit 151.

The touch sensor may have a form of a touch film, a touch sheet, a touch pad, and the like. The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When the touch sensor and the display unit 151 are overlaid in a layered manner, the display unit 151 may function as both an input device and an output device. Such a display unit 151 may also be called a 'touch screen'.

When there is a touch input through the touch screen, a corresponding signal (signals) are transmitted to a touch controller. The touch controller processes the signals transmitted from the touch sensor and transmits corresponding data to the controller 180. Accordingly, the controller 180 may recognize which portion of the display unit 151 has been touched.

When the touch screen is an electrostatic type touch screen, the touch screen may detect proximity of an object (or a detection target) based on a change in an electric field according to the proximity of the object. Such a touch screen may be classified as a proximity sensor 141.

The proximity sensor 141 is a sensor for detecting the presence or absence of an object by using the force of electromagnetism or infrared rays without a physical contact. Thus, the proximity sensor 141 has a considerably longer life span compared with a contact type sensor, and it can be utilized for various purposes. Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like.

In the following description, for the sake of explanation, recognition of an object to be sensed positioned to be close to the touch screen will be called a 'proximity touch', while recognition of actual contacting of an object to be sensed on the touch screen will be called a 'contact touch'.

The proximity sensor 141 senses a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. A video signal or an audio signal may also be output through the display unit 151 or the audio output module 152, so the display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a method of processing a user input with respect to the mobile terminal 100 will be described.

The user input unit 130 is manipulated to receive a command for controlling the operation of the mobile terminal 100 and may include a plurality of manipulation units. The manipulation units may be generally referred to as a manipulating portion, and various methods and techniques can be employed for the manipulation portion so long as they can be operated by the user in a tactile manner.

Various types of visual information may be displayed on the display unit 151. The information may be displayed in the form of character, number, symbol, graphic, icon, etc. In order to input the information, at least one of the character, number, symbol, graphic and icon is displayed in a certain arrangement so as to be implemented in the form of a keypad. Such keypad may be so-called 'soft key'.

The display unit 151 may be operated as a whole region or may be divided into a plurality of regions and accordingly operated. In the latter case, the plurality of regions may be operation in association with each other. For example, an output window and an input window may be displayed at upper and lower portions of the display unit 151, respectively. The output window and the input window are regions allotted for outputting or inputting information, respectively. Soft keys including numbers for inputting a phone number, or the like, may be outputted to the input window. When the soft key is touched, a number corresponding to the touched soft key is displayed on the output window. When the manipulation unit is manipulated, a call connection with respect to a phone number displayed on the output window is attempted, or text displayed on the output window may be input to an application.

The display unit 151 or the touch pad may be configured to sense touch scrolling. The user may move a cursor or a pointer positioned on an entity, e.g., an icon or the like, displayed on the display unit 151 by scrolling the display unit 151 or the touch pad. In addition, when the user moves his fingers on the display unit 151 or the touch pad, a path along which the user's fingers move may be visually displayed on the display unit 151. This may be useful in editing an image displayed on the display unit 151.

One function of the terminal may be executed in case where the display unit 151 and the touch pad are touched together within a certain time range. The both touches may be clamping the terminal body with the user's thumb and index finger. The one function executed in this case may be, for example, activation or deactivation of the display unit 151 or the touch pad.

Figure 2A:
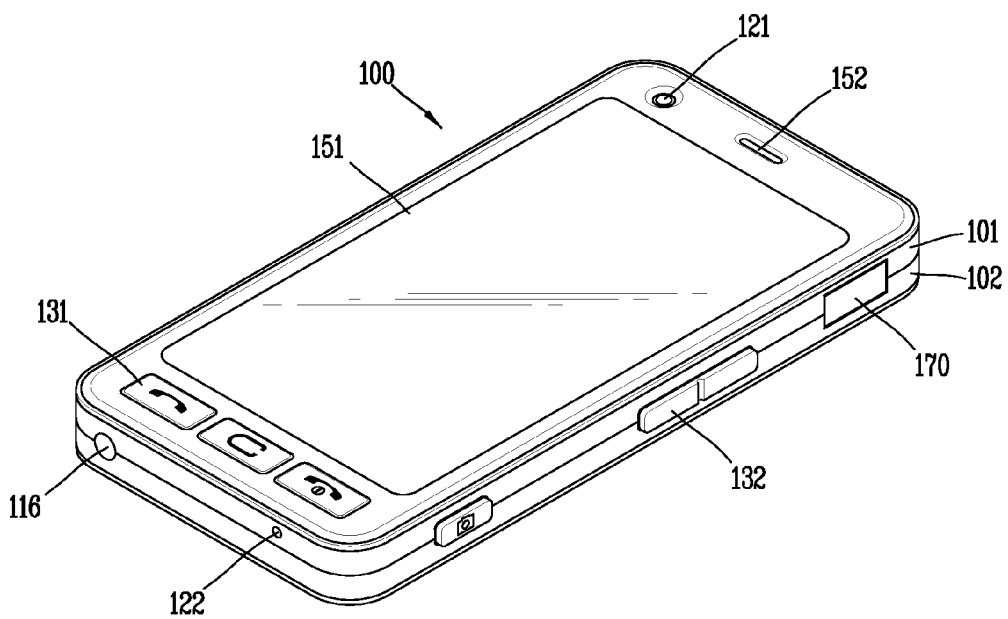
FIGS. 2A and 2B are perspective views showing the exterior of the mobile terminal according to an embodiment of the present invention.
Figure 2B:
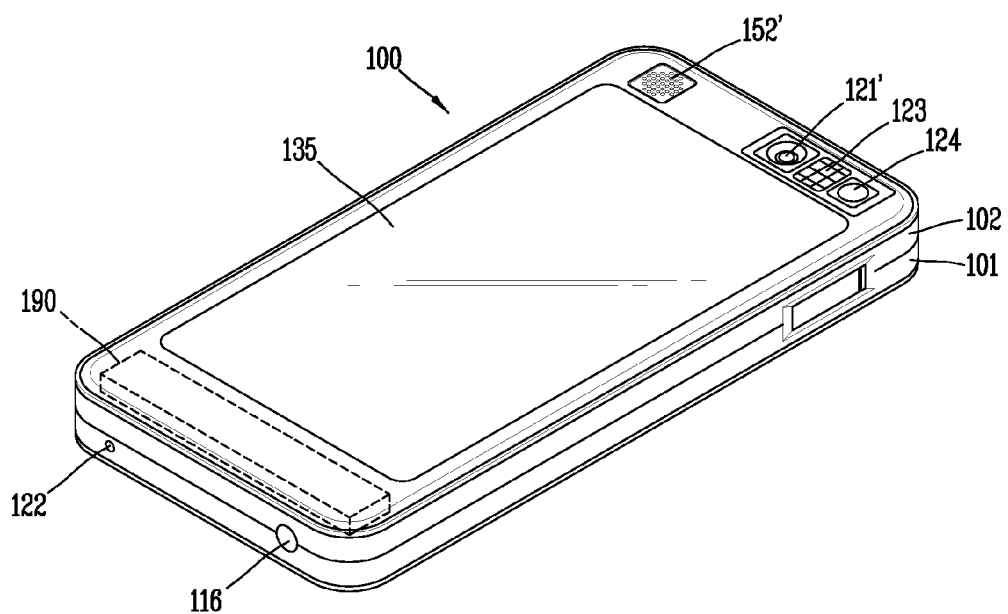

FIGS. 2A and 2B are perspective views showing an external appearance of the mobile terminal 100 according to an embodiment of the present invention. Specifically, FIG. 2A shows a front surface and one lateral surface of the mobile terminal 100, and FIG. 2B shows a rear surface and another lateral surface of the mobile terminal 100.

With reference to FIG. 2A, the mobile terminal 100 has a bar type terminal body. However, without being limited thereto, the present invention may also be applicable to a slide type mobile terminal, a folder type mobile terminal, a swing type mobile terminal, a swivel type mobile terminal, and the like, in which two or more bodies are coupled to be movable relatively.

The terminal body includes a case (or casing, housing, cover, etc.) constituting an external appearance of the terminal body. The case may be divided into a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, and the user input unit 130 (see FIG. 1), the microphone 122, the interface 170, and the like, may be located on the terminal body, namely, mainly, on the front case 101.

The display unit 151 occupies the most portion of the front surface of the front case 101. The audio output module 152 and the camera 121 are disposed at a region adjacent to one end portion of the display unit 151, and a first user input unit 131 and the microphone 122 are disposed at a region adjacent to the other end portion of the display unit 151. A second user input unit 132 and the interface 170 may be disposed on the sides of the front case 101 and the rear case 102.

The user input unit 130 is manipulated to receive commands for controlling the operation of the mobile terminal 100, and may include a plurality of manipulation units 131 and 132.

The first or second manipulation unit 131 or 132 may receive various commands. For example, the first manipulation unit may receive commands such as start, end, scroll, or the like, and the second manipulation unit 132 may receive commands such as adjustment of size of a sound outputted from the audio output module 152, conversion to a touch recognition mode of the display unit 151, and the like.

With reference to FIG. 2B, a rear camera 121' may additionally be disposed on a rear surface of the terminal body, namely, on the rear case 102. The rear camera 121' may have an image capture direction which is substantially opposite to that of the camera 121 (See FIG. 2A), and may support a different number of pixels (i.e., have a different resolution) than the front camera 121.

For example, the front camera 121 may have a relatively small number of pixels, and the rear camera 121' may have a relatively large number of pixels. Thus, the use of the front camera 121 for a video call can reduce the size of transmission data in case of capturing the user's face and transmitting the captured image to a counterpart in real time. Meanwhile, the rear camera 121' may be used for the purpose of storing a high quality image.

Meanwhile, the cameras 121 and 121' may be installed on the terminal such that they are rotated or popped up.

A flash 123 and a mirror 124 may be additionally disposed adjacent to the camera 121'. When the user captures an image of the subject with the rear camera 121', the flash 123 illuminates the subject. The mirror 124 allows the user to see himself when he wants to capture his own image (i.e., self-image capturing) by using the rear camera 121'.

An audio output unit 152' may be additionally disposed on the rear surface of the terminal body. The rear audio output unit 152' may implement a stereoscopic function along with the audio output module 152 (See FIG. 2A), and may be used for implementing a speaker phone mode during call communication.

A broadcast signal receiving antenna 116 may be additionally disposed on the side of the terminal body in addition to an antenna that supports call communications. The antenna 116 forming a portion of the broadcast reception module 111 (See FIG. 1) may be installed to be drawn out of the terminal body.

A power supply unit 190 for supplying power to the mobile terminal 100 may be installed on the terminal body. The power supply unit 190 may be installed in the terminal body or may be directly detached from the outside of the terminal body.

A touch pad 135 for detecting a touch may be additionally mounted on the rear case 102. Such touch pad may be configured to be light-transmissive like the display unit 151 (See FIG. 2A). Also, a rear display unit may be additionally mounted on the touch pad 135 in order to output visual information. In this case, information output from both of the front display unit 151 and the rear display unit may be controlled by the touch pad 135.

The touch pad 135 is operated in relation to the display unit 151. The touch pad 135 may be disposed to be parallel to the rear side of the display unit 151. The touch pad 135 may have the same size as or smaller than the display unit 151.

Meanwhile, the mobile terminal 100 may display contact items. In this case, the mobile terminal 100 may display a plurality of contact items of the same counterpart. For example, the mobile terminal 100 may display a contact item including a phone number, a contact item including an SNS address, and a contact item including a mail address all together with respect to a particular counterpart. However, when contact items with respect to a particular counterpart, among the plurality of contact items displayed on the display unit 151, are disposed in a scattered manner, the user cannot easily view the contact items of the particular counterpart at a glance.

Hereinafter, the mobile terminal 100 capable of effectively displaying a plurality of contact items and a control method thereof will be described with reference to the accompanying drawings.

Figure 3:
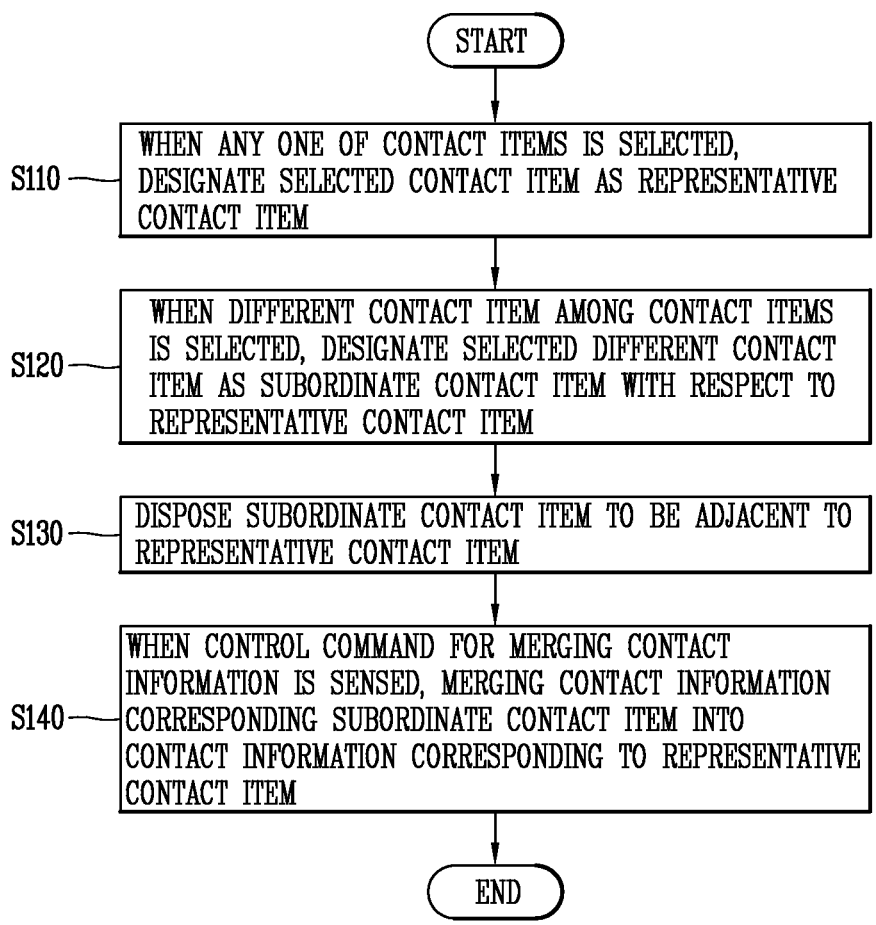
FIG. 3 is a flow chart illustrating a control method of a mobile terminal according to an embodiment of the present invention.

FIG. 3 is a flow chart illustrating a control method of a mobile terminal (100, See FIG. 1) according to an embodiment of the present invention. The mobile terminal 100 includes a display unit (151, See FIG. 1), and the controller 180 (180, See FIG. 1).

Referring to FIG. 3, first, when any one of contact items is selected, the selected contact item is designated as a representative contact item in step S110.

The display unit 151 may display a plurality of contact items. The contact items may include a phone number, an e-mail address, an SNS ID, and the like, of a counterpart. Thus, with respect to a particular counterpart, only one contact item may be displayed or a plurality of contact items may be displayed.

Meanwhile, an icon indicating whether each of the contact items corresponds to a phone number, an e-mail address, or an SNS ID may be displayed together with the contact items.

The contact items may be sorted according to various sorting methods so as to be displayed on the display unit 151. For example, the contact items may be sorted according to any one of a usage frequency order (i.e., in order in which how frequently the contact items have been used), a lately usage order (i.e., in order in which the contact items have been lately used according to date), and an alphabetic order, when displayed on the display unit 151.

When any one of the plurality of contact items is selected, for example, when a touch input applied to any of the plurality of contact items is sensed, the controller 180 may designate the selected contact item as a representative contact item.

When the representative contact item is designated, the controller 180 may divide the display unit 151 into first and second screen regions. The controller displays a representative contact item in the first screen region and the plurality of contact items in the second screen region.

Also, the controller 180 may display an indicator indicating that the selected contact item has been designated as a representative contact item, together with the representative contact item.

In detail, in order to discriminate the representative contact item from other contact items, the controller 180 may display an icon on the representative contact item, tick a checkbox corresponding to the representative contact item, change a color of the representative contact item, or change a 3D depth value of the representative contact item.

Next, after the representative contact item is designated, when a different contact item is selected from among the contact items, the controller designates the selected different contact item as a subordinate contact item with respect to the representative contact item in step S120.

In detail, when a contact item different from the representative contact item is selected from among the plurality of contact items, for example, when a touch input applied to at least one of the plurality of contact items is sensed, the controller 180 may designated the selected contact item as a subordinate contact item with respect to the representative contact item.

Thereafter, the subordinate contact item is disposed to be adjacent to the representative contact item in step S130.

In detail, when the subordinate contact item is designated, the controller 180 may display the subordinate contact item under the representative contact item displayed in the first screen region. In this case, in order to indicate that the subordinate contact item is subordinate to the representative contact item, the controller 180 may display an arrow icon together with the subordinate contact item.

Thereafter, when a control command for merging contact information is sensed, the controller 180 merges contact information corresponding to a subordinate contact item into contact information corresponding to the representative contact item in step S140.

When the contact information corresponding to the subordinate contact item is merged into the contact information corresponding to the representative contact item, the controller 180 may merge the first screen region and the second screen region into a single screen region and make the subordinate item disappear from the display unit 151.

Also, the controller 180 may display an icon indicating a number of subordinate contact items subordinate to the representative contact item together with the representative contact item. When the icon is selected, the controller 180 may display the subordinate contact items subordinate to the representative contact item on the display unit 151.

In this manner, when the contact information corresponding to the subordinate contact item with the contact information corresponding to the representative contact item, the controller 180 may control the subordinate contact item according to controlling performed on the representative contact item.

As described above, according to an embodiment of the present invention, among the plurality of contact items, a representative contact item and a subordinate contact item are designated, and since a group including a representative contact item and a subordinate contact item is generated, contact items may be grouped without performing a complicated manipulation. Thus, the user may conveniently and quickly group contact items.

Also, according to an embodiment of the present invention, since contact information corresponding to a subordinate contact item is merged into contact information corresponding to a representative contact item, when a touch input is applied to the representative contact item, the user may view the contact information corresponding to the representative contact item and contact information corresponding to a subordinate contact item at a glance. As a result, user convenience can be enhanced.

Figure 4:
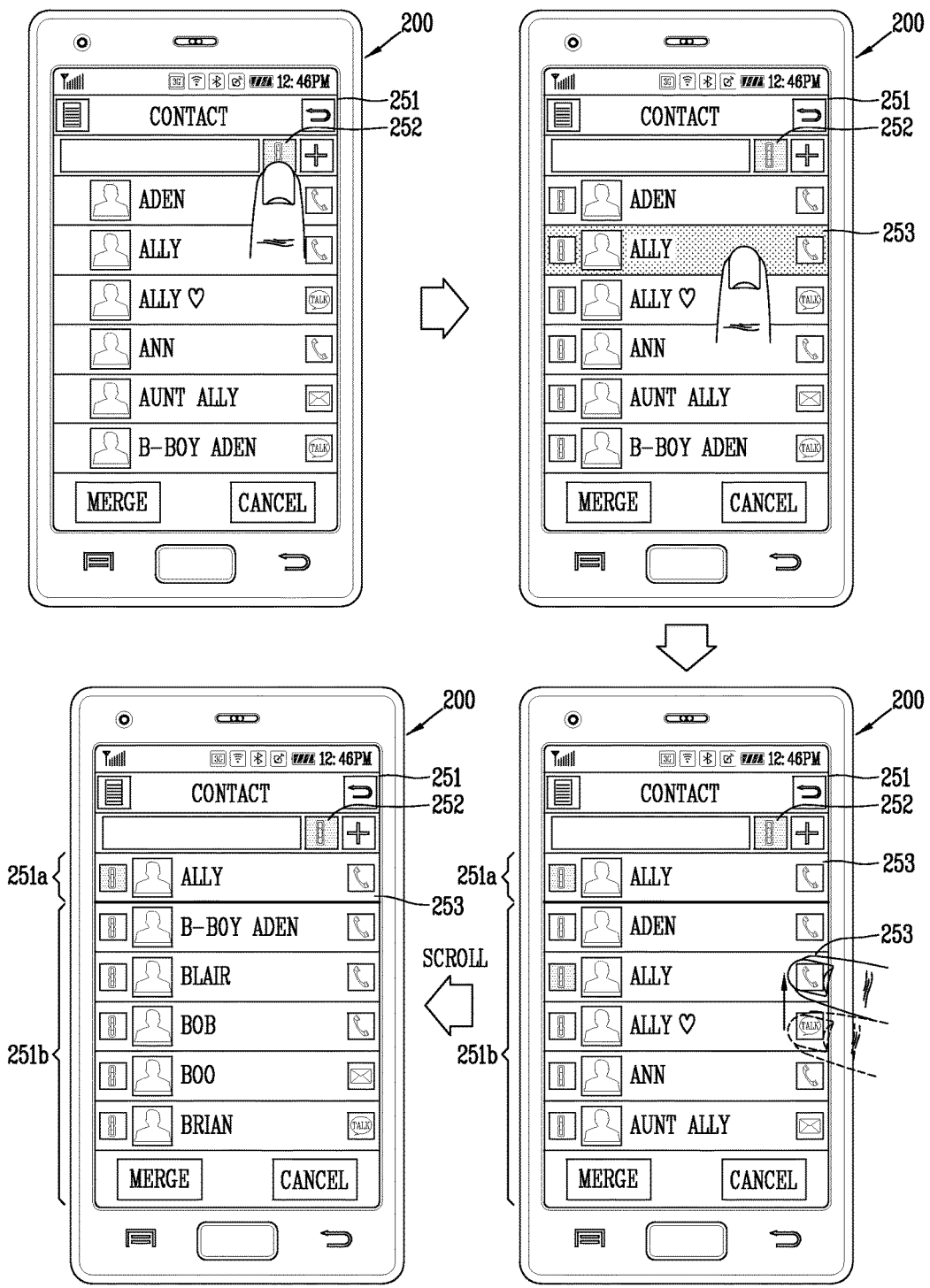
FIGS. 4 to 16 are conceptual views showing operational examples of the mobile terminal of FIG. 3.
Figure 5:
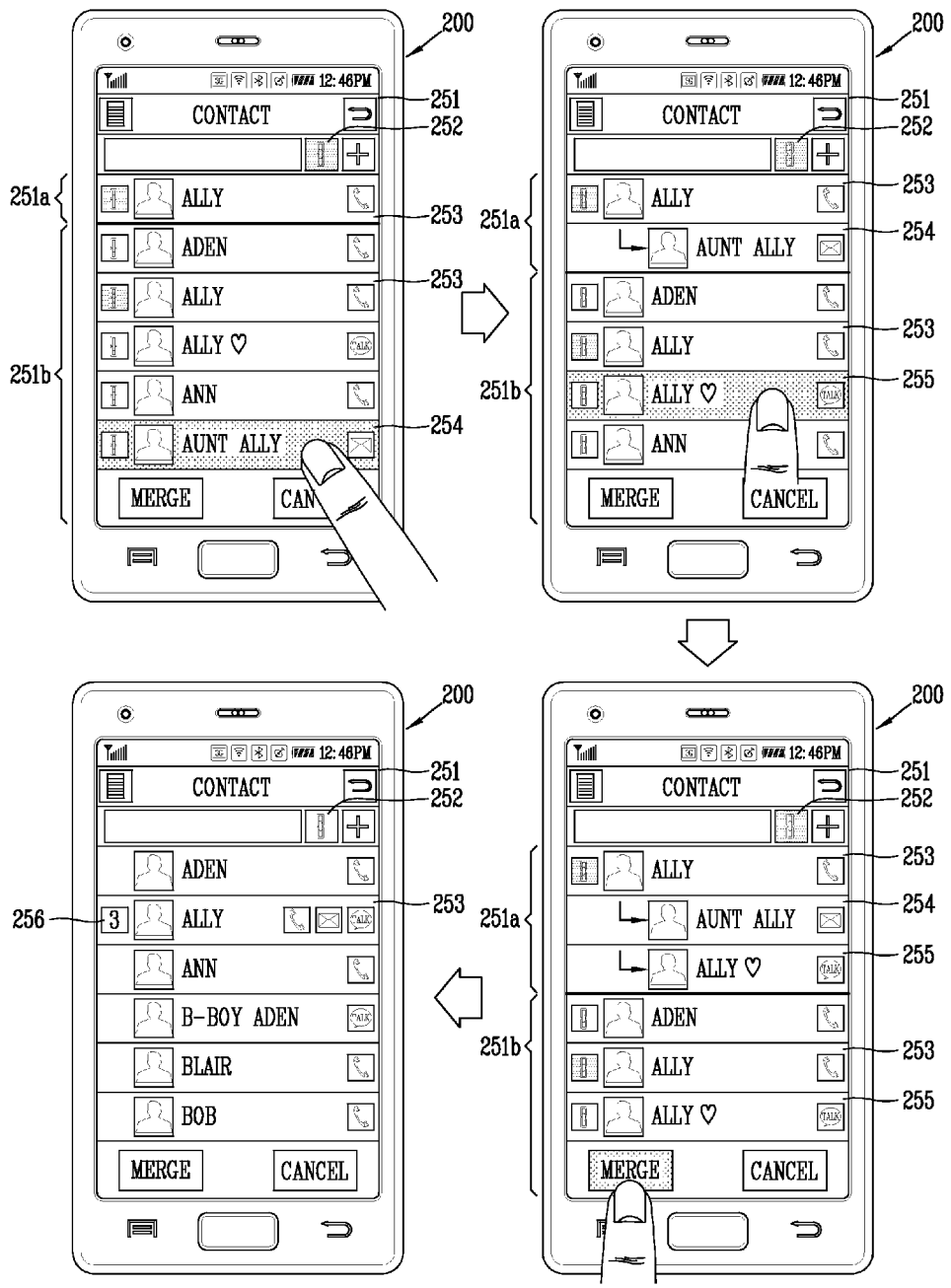

FIGS. 4 and 5 are conceptual views showing operational examples of a mobile terminal 200 of FIG. 3. The mobile terminal 200 includes a display unit 251, and the controller 180 (See FIG. 1).

Referring to FIG. 4, the display unit 251 may display a plurality of contact items. The contact items may include a phone number, an e-mail address, an SNS ID, and the like, of a counterpart. Thus, with respect to a particular counterpart, only one contact item may be displayed or a plurality of contact items may be displayed.

Meanwhile, an icon indicating whether each of the contact items corresponds to a phone number, an e-mail address, or an SNS ID may be displayed together with the contact items.

Also, the display unit 251 may display an icon 252 for executing a contact item merge mode.

First, when a touch input applied to the icon 252 is sensed, the controller 180 may execute a contact item merge mode. Then, the controller 180 may change a color of the icon 252 in order to indicate that the contact item merge mode is being executed. Also, the controller 180 may display icons indicating the contact item merge mode together with contact items on the display unit 251. Although not shown, the controller 180 may display a pop-up window indicating that the contact item merge mode is being executed on the display unit 251.

Next, when any one contact item 253 (hereinafter, referred to as a 'first contact item') among the contact items is selected, the controller 180 may designate the first contact item 253 as a representative contact item.

Thereafter, the controller 180 may generate a control command (hereinafter, referred to as a 'screen dividing command') for executing a function of dividing the screen into a plurality of regions. Based on the screen dividing command, the controller 180 may configure a first screen region 251a and a second screen region 251b. As illustrated, the first screen region 251a and the second screen region 251b may correspond to an upper region and a lower region generated by dividing the entire screen region of the display unit 251 in a horizontal direction, respectively.

Also, although not shown, the first screen region 251a and the second screen region 251b may correspond to a left region and a right region generated by dividing the entire screen region of the display unit 251 in a vertical direction, respectively. Meanwhile, the number of simultaneously displayed regions may be variously modified, rather than being limited thereto. Also, the first screen region 251a and the second screen region 251b may be formed to be scrolled individually.

A bar dividing the first screen region 251a and the second screen region 251b may be selected based on a touch applied to the display unit 251. For example, when the bar is dragged toward the second screen region 251b, the bar may be moved in the direction of the second screen region 251b.

Accordingly, the first screen region 251a may be upsized, while the second screen region 251b may be downsized simultaneously.

As illustrated, when the display unit 251 is divided into the first screen region 251a and the second screen region 251b, the controller 180 may display the first contact item 253 in the first screen region 251a. In this case, a plurality of contact items may be displayed in the second screen region 251b.

Also, the controller 180 may display an indicator indicating that the first contact item 253 is designated as a representative contact item. For example, as illustrated, in order to discriminate the representative contact item from other contact items, the controller 180 may change a color of the icon displayed together with the first contact item 253.

Although not shown, in order to discriminate the representative contact item from other contact items, the controller 180 may display an icon in the representative contact item, tick a checkbox corresponding to the representative contact item, change a color of the representative contact item, or change a 3D depth value of the representative contact item.

Meanwhile, the first screen region 251a and the second screen region 251b may be configured to be scrolled individually. In this case, as illustrated, although screen information displayed on the second screen region 251b is changed as the second screen region 251b is scrolled, screen information (e.g., the first contact item 253) displayed in the first screen region 251a is not changed.

Referring to FIG. 5, after the first contact item 253 is designated as a representative contact item, when any one contact item 254 (hereinafter, referred to as a 'second contact item'), among the contact items displayed on the second screen region 251b, is selected, the controller 180 may designate the second contact item 254 as a subordinate contact item.

Thereafter, the controller may display the second contact item 254 in the first screen region 251a. in this case, a plurality of contact items may be displayed in the second screen region 251b. In detail, the controller 180 may display the second contact item 254 designated as the subordinate contact item in the first screen region 251a, under the first contact item 253 designated as a representative contact item.

In this case, in order to indicate that the second contact item 254 is subordinate to the first contact item 253, the controller 180 may display an arrow icon together with the second contact item 254.

Thereafter, when another contact item 255 (hereinafter, referred to as a 'third contact item'), among the contact items displayed in the second screen region 251b, is selected, the controller 180 may designate the third contact item 255 as a subordinate contact item.

Similarly, the controller 180 may display the third contact item 255 designated as a subordinate contact item under the first contact item 253 designated as a representative contact item in the first screen region 251a.

Thereafter, when a control command for merging contact information is sensed, the controller 180 may merge contact information corresponding to the subordinate contact items (e.g., the second and third contact items 254 and 255) into contact information corresponding to the representative contact item (e.g., the first contact item 253).

Also, when the contact information is merged, the controller 180 may merge the first screen region 251a and the second screen region 251b into one screen region, and make the second and third contact items 254 and 255 designated as subordinate contact items disappear from the display unit 251.

In this case, the controller 180 may display an icon 256 indicating a number of contact items (e.g., three contact items) in which contact information has been merged, together with the first contact item 253. When the icon 256 is selected, the controller 180 may display again the second and third contact items 254 and 255 subordinate to the first contact item 253 on the display unit 251.

Meanwhile, although not shown, the controller 180 may display an icon indicating a number of subordinate contact items (e.g., two subordinate contact items) subordinate to the first contact item 253, together with the representative contact item.

Also, the controller 180 may designate a representative image to be displayed together with the first contact item 253. The representative image may be an image corresponding to the first contact item 253, or although not shown, it may be a particular image indicating that a plurality of contact items have been merged, or may be an image selected by the user.

Figure 6:
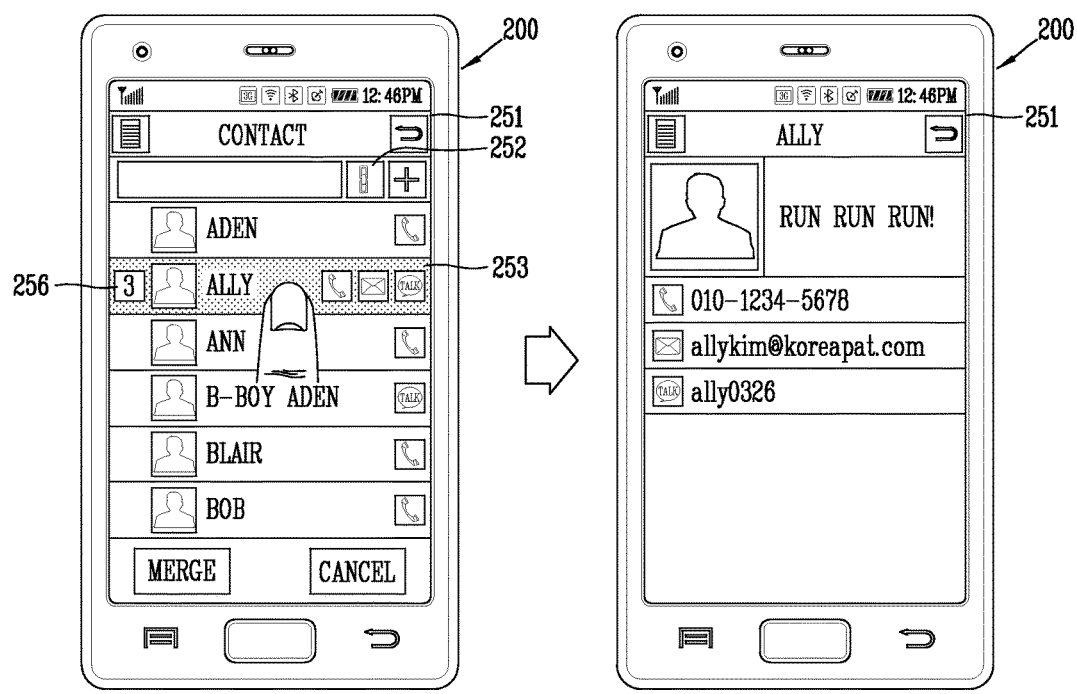
Figure 7:
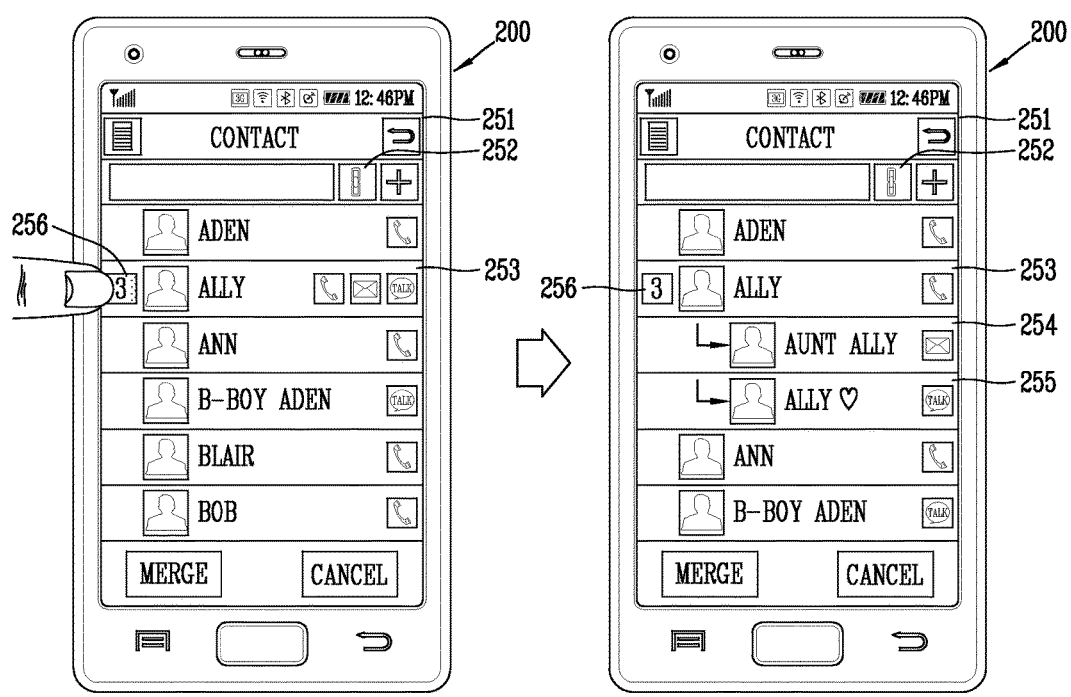

FIGS. 6 and 7 are conceptual views illustrating operational examples of the mobile terminal 200 according to FIG. 3. The mobile terminal 200 includes the display unit 251, and the controller 180 (See FIG. 1).

The display unit 251 may display a plurality of contact items. In this case, when the contact information corresponding to the plurality of contact items is merged, the controller 180 may display only the first contact item 253 designated as a representative contact item among the plurality of contact items on the display unit 251 and make the contact items designated as subordinate contact items from the display unit 251.

Accordingly, the first contact item 253 designated as a representative contact item may be displayed on the display unit 251. Also, the icon 256 indicating the number of merged contact items (e.g., three items) may be displayed together with the first contact item 253.

In this case, when the first contact item 253 designated as a representative contact item is selected, referring to FIG. 6, the controller 180 may display the merged contact information, i.e., the first to third contact items, together with each corresponding contact information.

Also, when the icon 256 indicating the number of merged contact items is selected, referring to FIG. 7, the controller 180 may display again the second and third items 254 and 255 subordinate to the first contact item 253 on the display unit 251.

Figure 8:
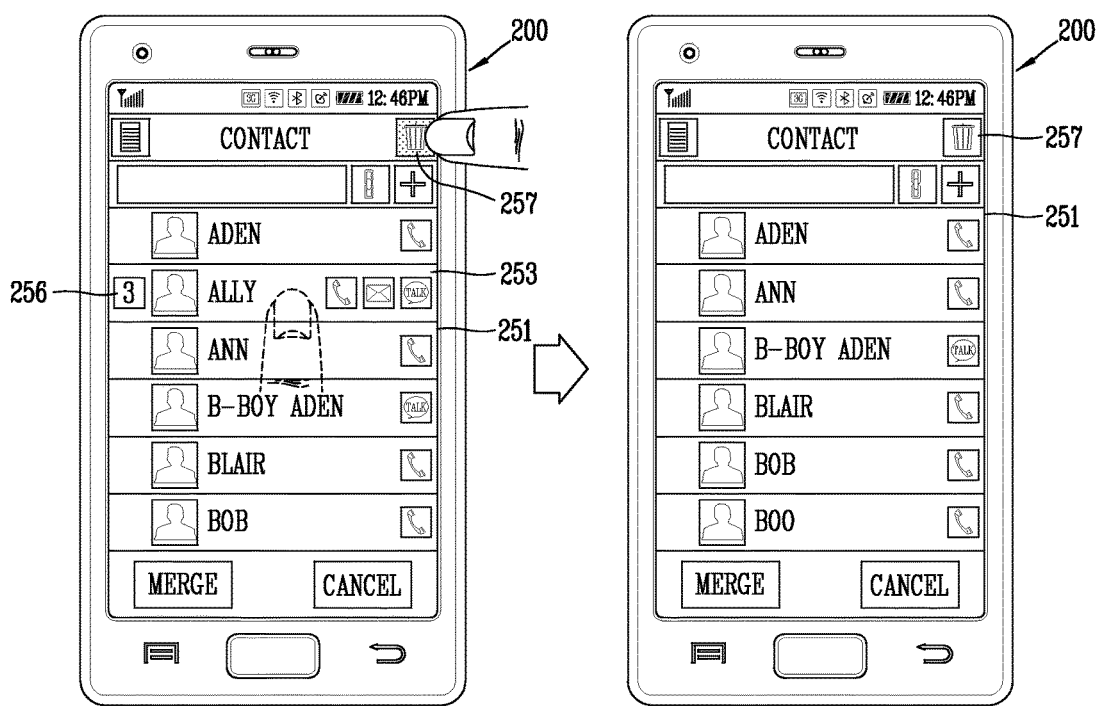
Figure 9:
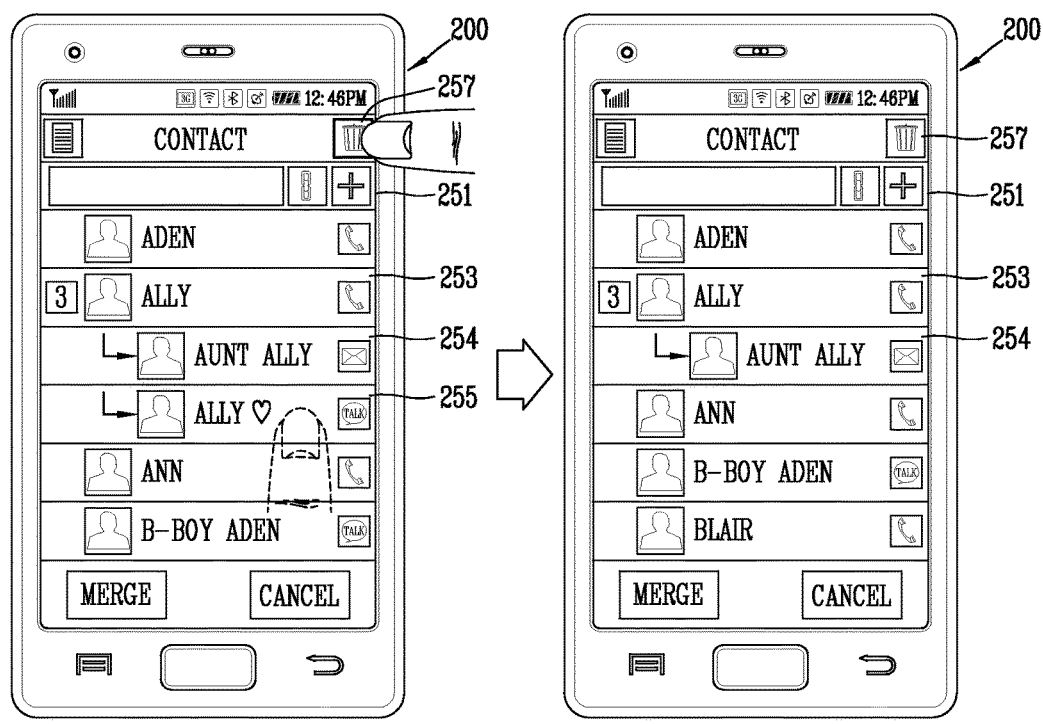

FIGS. 8 and 9 are conceptual views illustrating operational examples of the mobile terminal 200 according to FIG. 3. The mobile terminal 200 includes the display unit 251, and the controller 180 (See FIG. 1).

Referring to FIG. 8, the controller 180 may display only the first contact item designated as a representative contact item, among a plurality of contact items, on the display unit 251 and make contact items designated as subordinate contact items disappear from the display unit 251.

The controller 180 may control a subordinate contact item according to controlling performed on the representative contact item. In detail when a control command for deleting the first contact item 253 is detected, for example, when the first contact item 253 is selected and a touch input applied to the deletion icon 257 is sensed, the controller 180 may delete the second and third contact items 254 and 255, as well as the first contact item 253.

Meanwhile, referring to FIG. 9, when a control command for deleting the third contact item 255 is sensed, for example, when the third contact item 255 is selected and a touch input applied to a deletion icon 257 is sensed, the controller 18 may delete only the third contact item 255, regardless of the first and second contact items 253 and 254.

Figure 10:
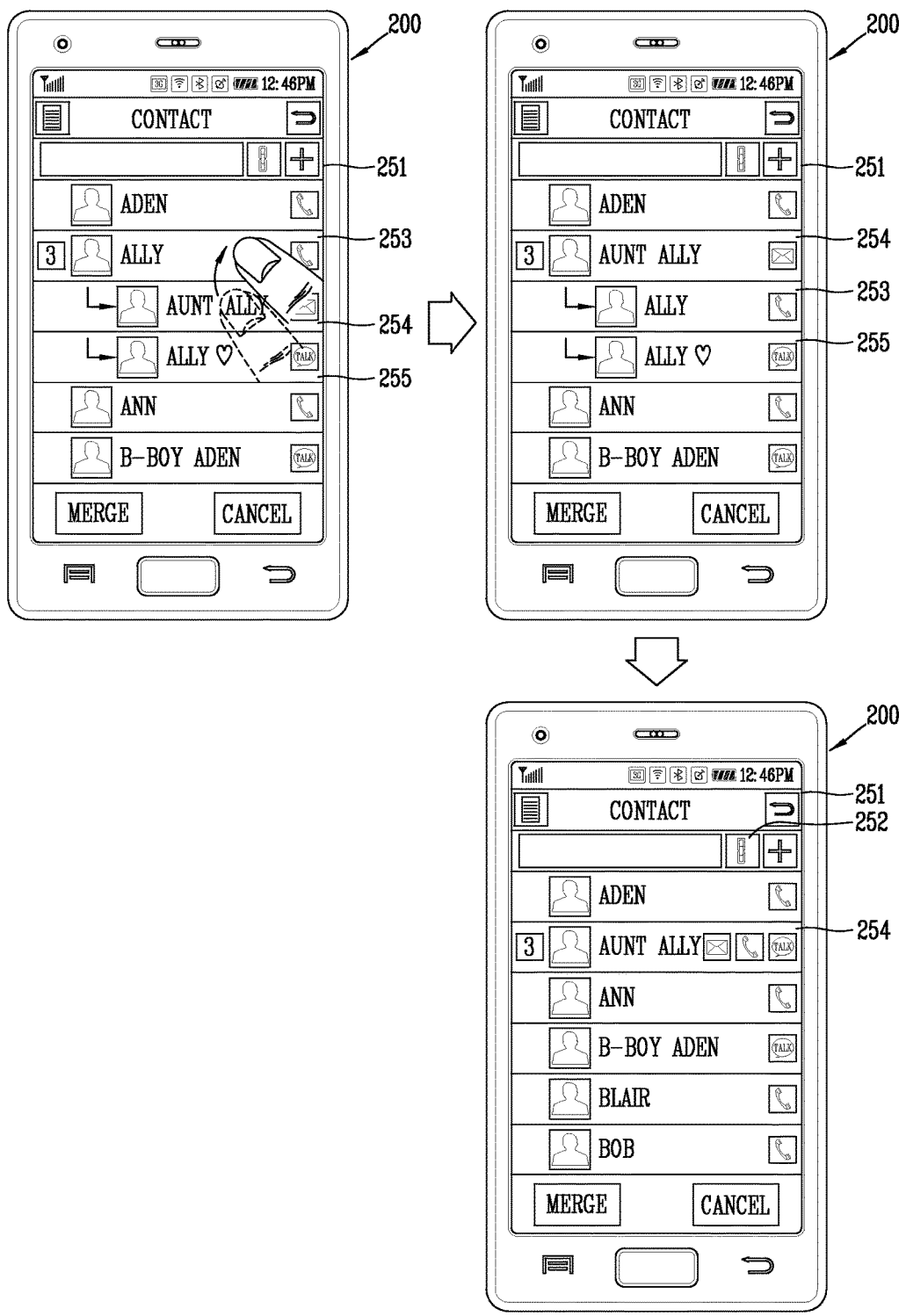

FIG. 10 is a conceptual view illustrating an operational example of the mobile terminal 200 according to FIG. 3. The mobile terminal 200 includes the display unit 251, and the controller 180 (See FIG. 1).

Referring to FIG. 10, the controller 180 may generate a group including a representative contact item and subordinate contact items subordinate to the representative contact item. As illustrated, the controller 180 may generate a group including the first contact item 253, and the second and third contact items 254 and 255 subordinate to the first contact item, and display them on the display unit 251.

In this case, based on a touch input applied to the display unit 251, the controller 180 may newly designate the representative contact item among the contact items included in the generated group.

In detail, when the second contact item 254 designated as the subordinate contact item is dragged toward the first contact item 253 designated, the controller 180 may designate the second contact item 254 as a representative contact item. At the same time, the controller 180 may designate the first contact item 253 as a subordinate contact item.

Thereafter, the controller 180 may merge contact information corresponding to the first and third contact items 253 and 255 with contact information corresponding to the second contact item 254.

Also, when the contact information are merged, the controller 180 may make the first and third contact items 253 and 255 designated as the subordinate contact items disappear from the display unit 251. In this case, the controller 180 may display the icon 256 indicating the number of contact items (e.g., three contact items) in which contact information have been merged, together with the second contact item 254.

Figure 11:
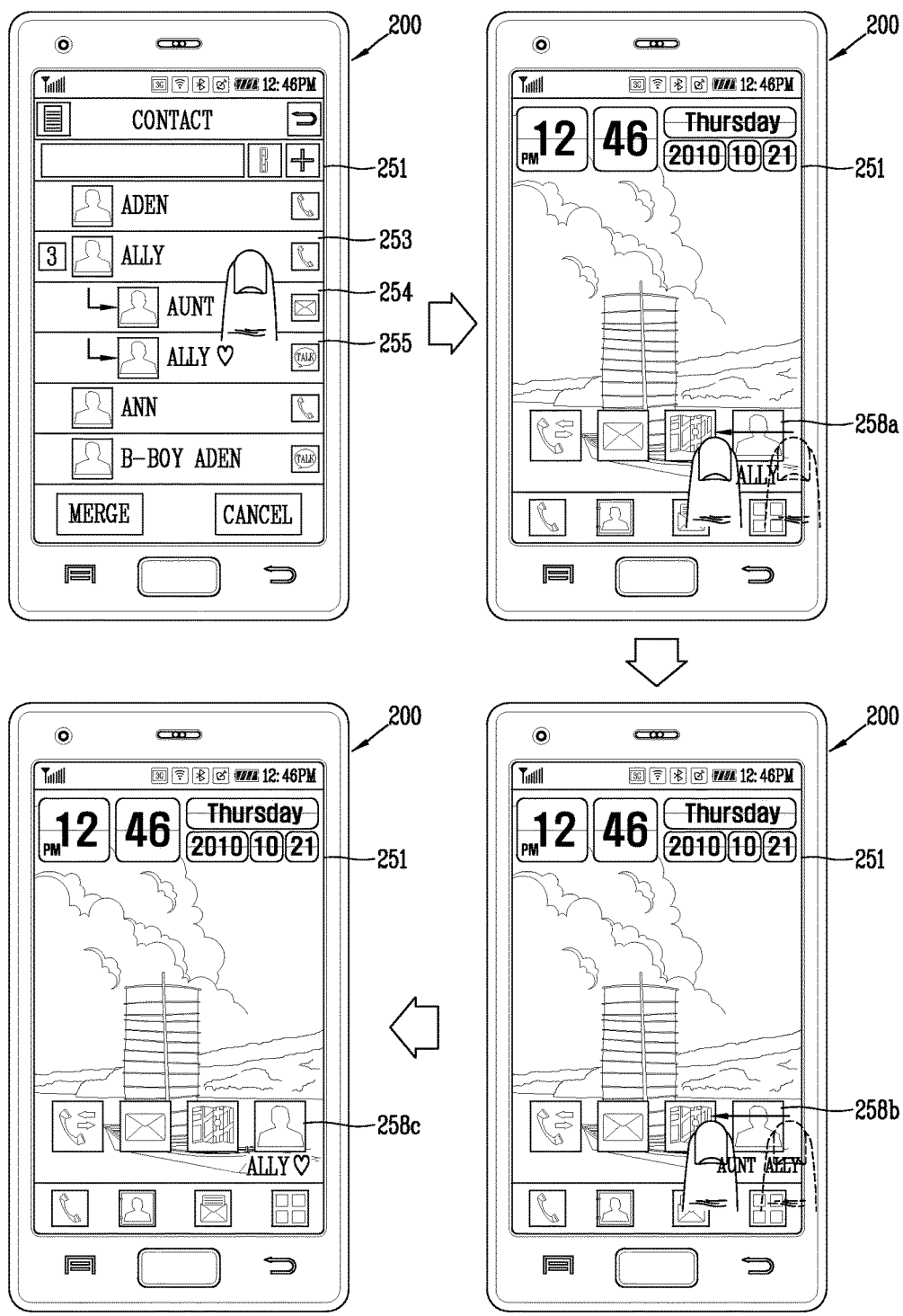

FIG. 11 is a conceptual view illustrating an operational example of the mobile terminal 200 according to FIG. 3. The mobile terminal 200 includes the display unit 251, and the controller 180 (See FIG. 1).

Referring to FIG. 11, the controller 180 may generate a group including the first contact item 253 and the second and third contact items 254 and 255 subordinate to the first contact item 253, and display the same on the display unit 251.

In this case, when a touch input applied to at least one of the contact items included in the generated group is sensed, the controller 180 may display an icon corresponding to the generated group on the wall paper.

In detail, when a touch input applied to the first contact item 253 displayed on the display unit 251 is sensed, the controller 180 may display a first icon 258a corresponding to the first contact item 253 on the wall paper.

When a touch input, e.g., a drag input, applied to the first icon 258a is sensed, the controller 180 may change the first icon 258a into a second icon 258b corresponding to the second contact item 254. Similarly, when a touch input applied to the second icon 258b is sensed, the controller 180 may change the second icon 258b into a third icon 258c corresponding to the third contact item 255.

Figure 12:
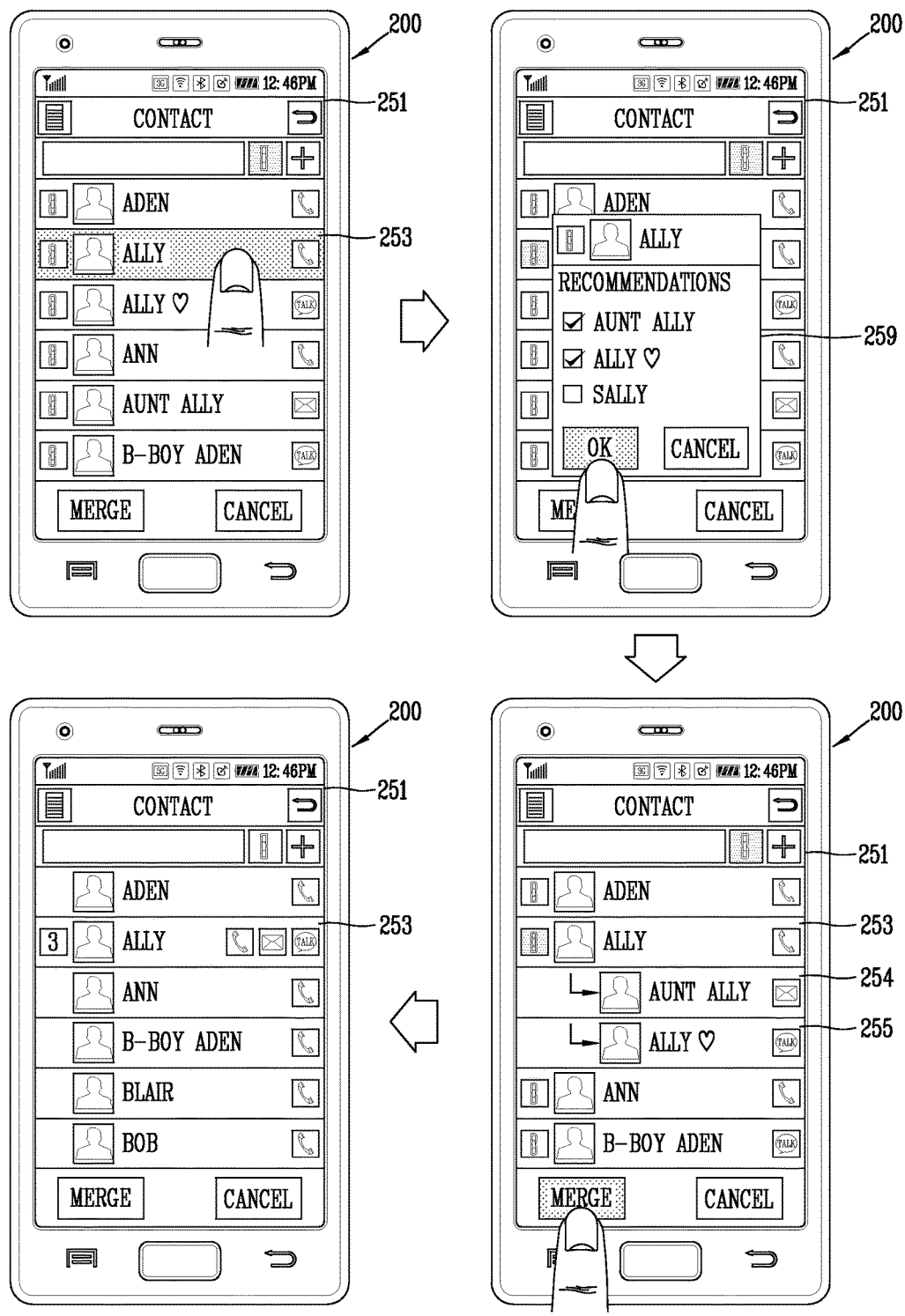
Figure 13:
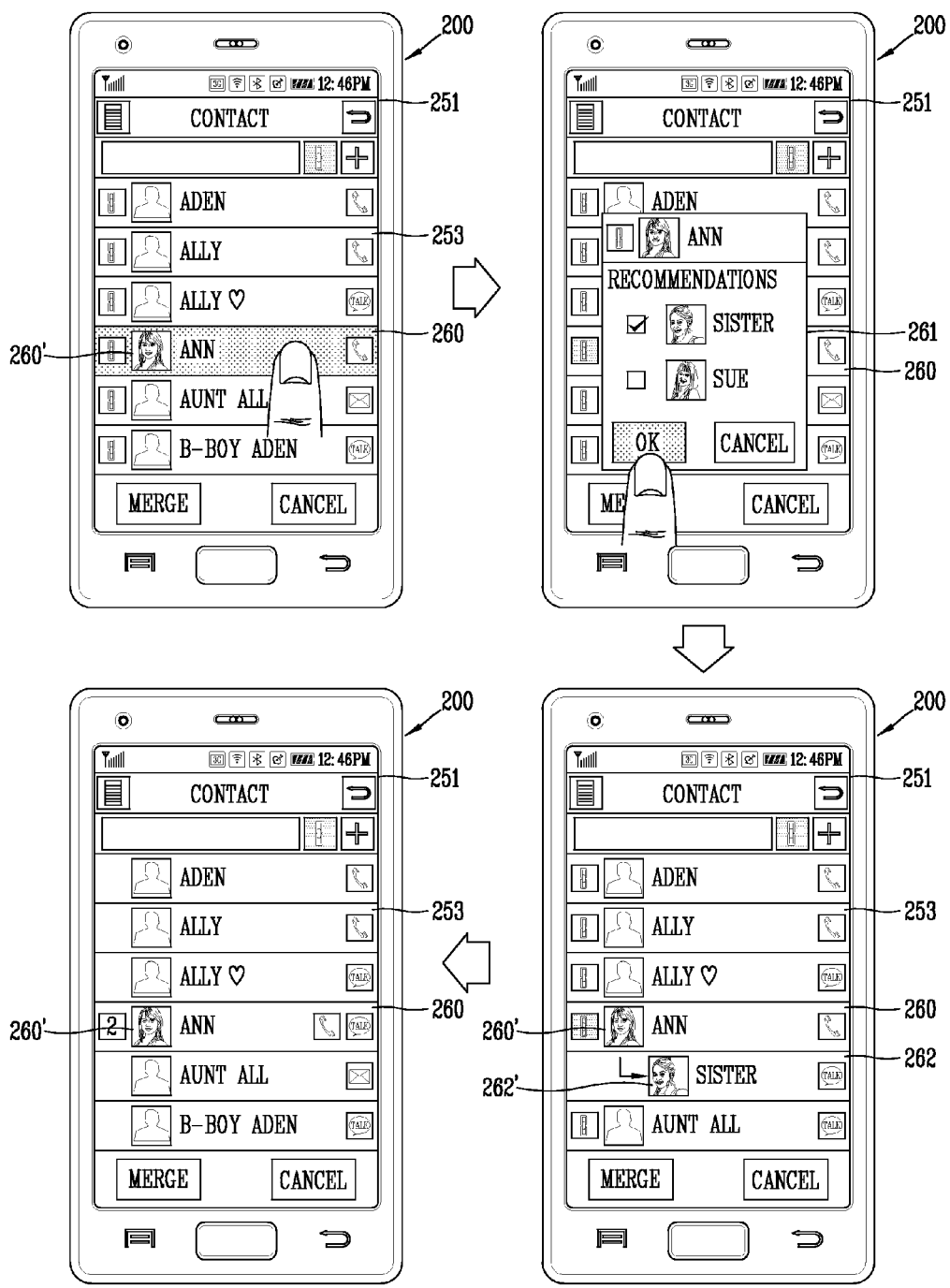

FIGS. 12 and 13 are conceptual views illustrating an operational example of the mobile terminal 200 according to FIG. 3. The mobile terminal 200 includes the display unit 251, and the controller 180 (See FIG. 1).

Referring to FIG. 12, the display unit 251 may display a plurality of contact items. When one of the plurality of contact items (hereinafter, referred to as a 'first contact item') is selected, the controller 180 may designate the first contact item 253 as a representative contact item.

Next, by using first contact information corresponding to the first contact item 253, the controller 180 may extract contact items in relation to the first contact information from the plurality of contact items. Also, the controller 180 may display the extracted contact items on the display unit 251. As illustrated, a pop-up window 259 including the extracted contact items may be displayed on the display unit 251.

The extracted contact items may be sorted according to various sorting methods so as to be displayed on the pop-up window 259. For example, the extracted contact items may be sorted according to any one of a usage frequency order (i.e., in order in which how frequently the extracted contact items have been used), a lately usage order (i.e., in order in which the extracted contact items have been lately used according to date, and an alphabetic order, when displayed on the pop-up window 259.

When at least some of the contact items included in the pop-up window 259 are selected, the controller 180 may designate the selected contact items as subordinate contact items. And, the controller 180 may display the second and third contact items 254 and 255 designated as subordinate contact items, under the first contact item 253.

Thereafter, when a control command for merging the contact information is sensed, the controller 180 may merge the contact information corresponding to the subordinate contact items with the contact information corresponding to the representative contact item. And then, the controller 180 may make the second and third contact items 254 and 255 disappear from the display unit 251.

Meanwhile, referring to FIG. 13, a detection unit (not shown) may detect a representative face image from image information corresponding to the representative contact item. Namely, as illustrated, the detection unit (not shown) may detect a representative face image from image information 260' corresponding to a fourth contact item 260. also, the detection unit (not shown) may detect face images from image information corresponding to each of the plurality of contact items.

The detection unit (not shown) may detect the face image displayed on the display unit 251 by using a face recognition algorithm. The face recognition algorithm refers to an algorithm for recognizing a face by using outline information, appearance, and the like, of a face discriminated from other regions based on the image information corresponding to the contact item, and detecting a face image.

The face recognition algorithm may include a face region extracting process of discriminating (or determining) where is a face based on the image information corresponding to a contact item and a face recognizing process of discriminating (or determining) what kind of face has been found.

Through such a face recognition process, the detection unit (not shown) may identify a face by distances between and shapes of eyes, nose, and mouth as major parts of the face and their shapes, to obtain face recognition information.

The controller 180 may compare the face recognition information of each of face images detected by the detection unit (not shown) with the face recognition information corresponding to the representative face image, and extract a contact item having a face image corresponding to the representative face image from a plurality of contact items.

Also, the controller 180 may display the extracted contact items on the display unit 251. As illustrated, a pop-up window 261 including the extracted contact items may be displayed on the display unit 251.

When at least one of the contact items included in the pop-up window 261 is selected, the controller 180 may designate the selected contact item as a subordinate contact item. And, the controller 180 may display a fifth contact item 262 designated as a subordinate contact item, under a fourth contact item 260.

Thereafter, when a control command for merging contact information is sensed, the controller 180 may merge contact information corresponding to the representative contact item with contact information corresponding to a representative contact item. And, the controller 180 may make the fifth contact item 262 disappear from the display unit 251.

Figure 14:
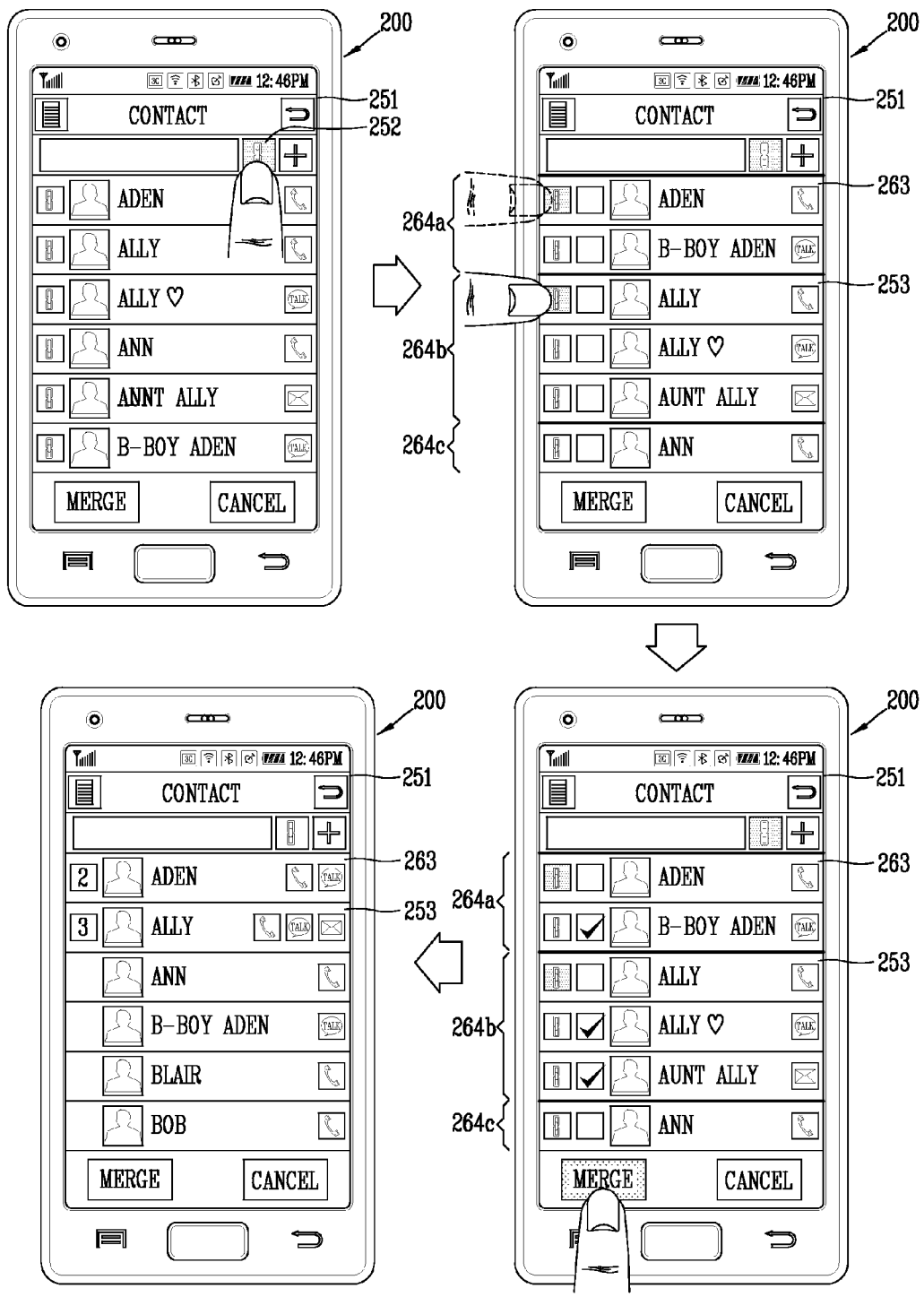

FIG. 14 is a conceptual view illustrating an operational example of the mobile terminal 200 according to FIG. 3. The mobile terminal 200 includes the display unit 251, and the controller 180 (See FIG. 1).

Referring FIG. 14, the controller 180 may classify a plurality of contact items into a plurality of groups by using contact information corresponding to each of a plurality of contact items. In this case, a reference used for grouping may be designated by the user or the controller 180. As a reference used for grouping, for example, whether or not some numbers of a phone number are the same, whether some characters of alphabets constituting a name are the same, whether a counterpart is a member of the same community, and the like, may be considered.

Meanwhile, a plurality of references may be considered. For example, a plurality of contact items may be primarily grouped according to a first reference, and the plurality of primarily grouped contact items may be secondarily grouped according to a second reference. As a result, the plurality of secondarily grouped contact items may be classified into a plurality of groups so as to be displayed on the display unit 251.

As illustrated, a plurality of groups may be discriminately displayed on the display unit 251. For example, first to third groups may be displayed in first to third screen regions 264a, 264b, and 264c, respectively.

Each of the plurality of groups may be sorted according to various sorting methods so as to be displayed on the display unit 151. For example, the plurality of groups may be sorted according to any one of a usage frequency order of the contact items (i.e., in order in which how frequently the contact items have been used), a lately usage order of the contact items (i.e., in order in which the contact items have been lately used according to date), and an alphabetic order, when displayed on the display unit 151.

In this case, when any one contact item, e.g., the first contact item 263, among the contact items included in the first group is selected, the controller 180 may designate the first contact item 263 as a representative contact item. Thereafter, when a different contact item, e.g., a second contact item, among the contact items included in the first group, is selected, the controller 180 may designate the second contact item as a subordinate contact item with respect to the first contact item 263. Similarly, with respect to the second group and the third group, a representative contact item and a subordinate contact item may be designated according to a user selection.

Thereafter, when a control command for merging contact information is sensed, the controller 180 may merge contact information corresponding to the subordinate contact items with contact information corresponding to the representative contact item. And then, the controller 180 may make the contact items designated as the subordinate contact items disappear from the display unit 251.

Meanwhile, although not shown, when a touch input with respect to the contact items is sensed, the controller 180 may detect attribute information of the sensed touch input. And, based on the attribute information of the detected touch input, the controller 180 may designate the touched contact item as any one of a representative contact item and a subordinate contact item.

For example, when a first drag input in relation to designation of a representative contact item, applied to the first contact item 263 is sensed and a second drag input in relation to designation of a subordinate contact item, applied to the second contact item is sensed, the controller 180 may designate the first contact item 263 as a representative contact item and the second contact item as a subordinate contact item.

Figure 15:
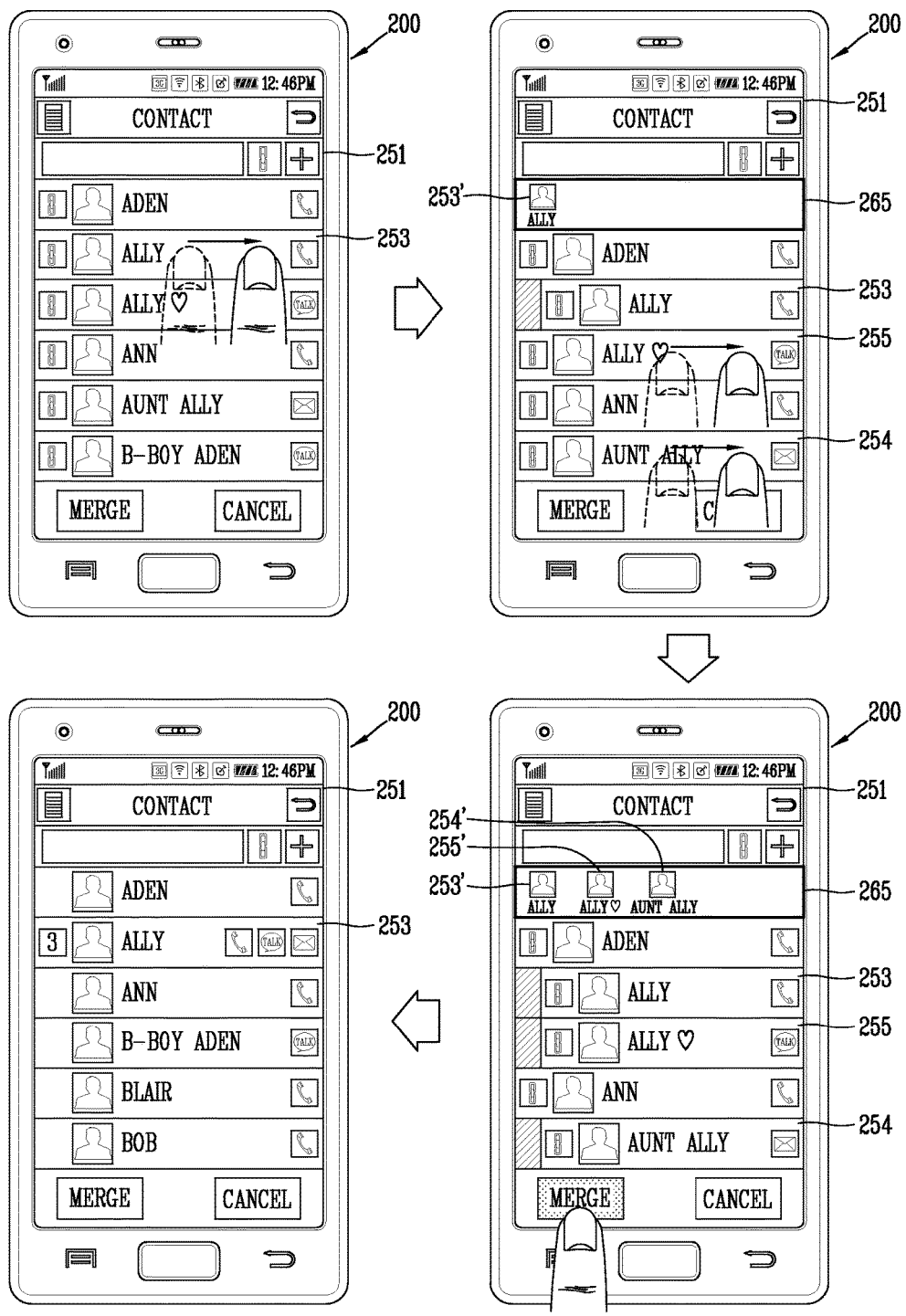

FIG. 15 is a conceptual view illustrating an operational example of the mobile terminal 200 according to FIG. 3. The mobile terminal 200 includes the display unit 251, and the controller 180 (See FIG. 1).

Referring to FIG. 15, the controller 180 may group contact items selected from among a plurality of contact items. As illustrated, when a touch input applied to the first contact item 253, among the plurality of contact items, is sensed, the controller 251 may generate a group region 265 on the display unit 251, and display a first object 253' corresponding to the first contact item 253 in the group region 265. In this case, the controller 180 may display an indicator indicating that the first contact item 253 has been selected, together with the first contact item 253.

Similarly, when a touch input applied to the second and third contact items 254 and 255, among the plurality of contact items, is sensed, respectively, the controller 180 may display second and third objects 254' and 255' corresponding to the second and third contact items 254 and 255, respectively, in the group region 265. Also, the controller 180 may display indicators indicating that the second and third items 254 and 255 have been selected, together with the second and third contact items 254 and 255.

Meanwhile, the controller 180 may designate an object displayed in a particular position, e.g., the first object 253' displayed in the leftmost position, among the first to third objects 253', 254', and 255' included in the group region 265, as a representative contact item and designate the other objects 254' and 255' as subordinate contact items.

Although not shown, when the disposition order of the first to third objects 253', 254', and 255' is changed according to a touch input, the representative contact item may be changed into a different object.

Thereafter, when a control command for merging contact information is sensed, the controller 180 may merge contact information corresponding to subordinate contact items into the contact information corresponding to the representative contact item. And, the controller 180 may make the contact items designated as subordinate contact items disappear from the display unit 251.

Figure 16:
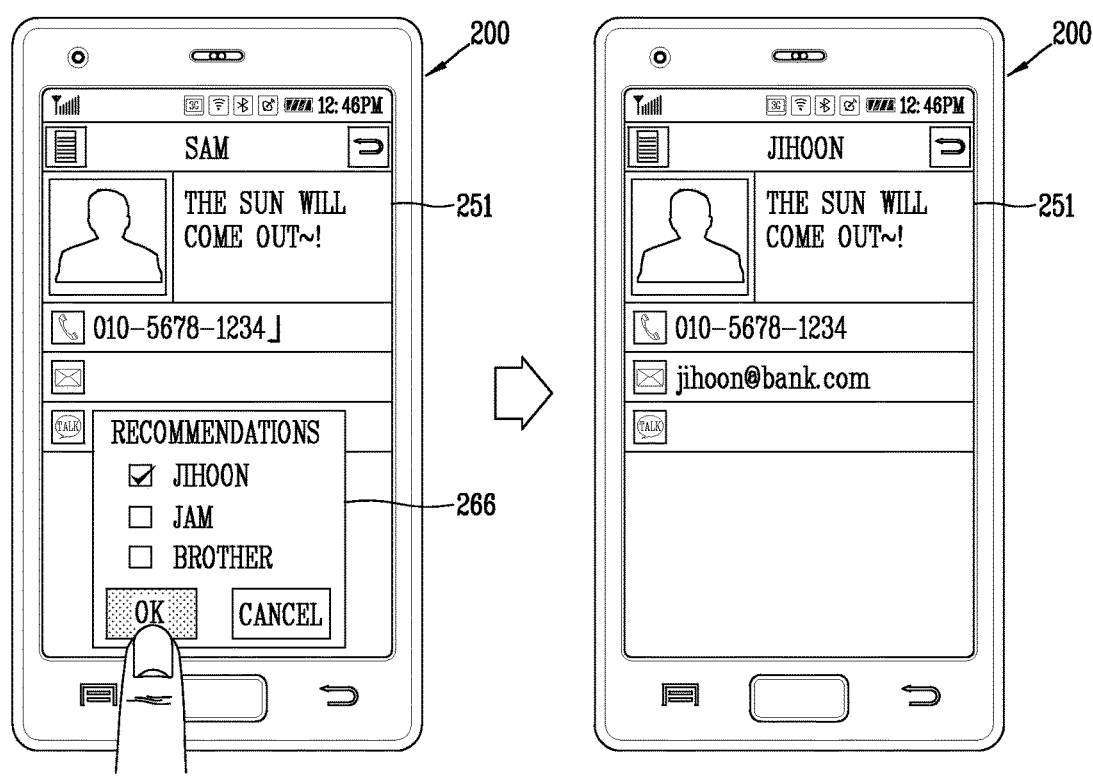

FIG. 16 is a conceptual view illustrating an operational example of the mobile terminal 200 according to FIG. 3. The mobile terminal 200 includes the display unit 251, and the controller 180 (See FIG. 1).

Referring to FIG. 16, when a control command for adding a new contact item is sensed, the controller 180 may extract contact items in relation to contact information contact information among a plurality of contact items by using contact information corresponding to the contact item to be added.

As illustrated, when contact information for adding a new contact item is input, the controller 180 may extract contact items in relation to the input contact information among a plurality of contact information by using input contact information, e.g., counterpart name information and phone number information. Also, the controller 180 may display the extracted contact items on the display unit 251. As illustrated, a pop-up window 266 including the extracted contact items on the display unit 251.

When one of the contact items included in the pop-up window 266 is selected, the controller 180 may merge input contact information into the contact information corresponding to the selected contact item. Conversely, although not shown, the controller 180 may merge contact information corresponding to the selected contact item into the input contact information.

In the embodiments of the present invention, the foregoing method may be implemented as codes that can be read by a processor in a program-recorded medium. The processor-readable medium may include any types of recording devices in which data that can be read by a computer system is stored. The computer-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a display configured to display a first contact list including a plurality of contact items arranged along a particular direction, the plurality of contact items including a first contact item and a second contact item; and
   a controller configured to:
      receive a touch input selecting the first contact item;
      designate the first contact item as a representative contact item in response to the touch input selecting the first contact item;
      divide the display into a first screen region and a second screen region in response to designating the first contact item as the representative contact;
      display information associated with the representative contact item in the first screen region and the first contact list in the second screen region;
      scroll the second screen region in response to a drag input applied into the second screen region along the particular direction, wherein the information associated with the representative contact item is continuously displayed in the first screen region while the second screen region is scrolled;
      receive an additional touch input selecting the second contact item;

designate, in response to the additional touch input, the second contact item as a subordinate contact item linked to the representative contact item; and display, based on designating the second contact item as the subordinate contact item, a second contact list that excludes the second contact item.

2. The mobile terminal of claim 1, wherein the controller is further configured to:

display a bar that divides the first and second screen regions wherein, when the bar is dragged toward the second screen region, the first screen region is upsized, while the second screen region is downsized simultaneously.

3. The mobile terminal of claim 1, wherein when the first contact item is designated as the representative contact item, the controller displays an indicator indicating the representative contact item together with the first contact item.

4. The mobile terminal of claim 1, wherein when the second contact item is designated as the subordinate contact item, the controller displays the subordinate contact item in a lower side of the representative contact item in the first screen region.

5. The mobile terminal of claim 1, wherein contact information corresponding to the subordinate contact item is merged into contact information corresponding to the representative contact item.

6. The mobile terminal of claim 1, wherein the controller displays an icon together with the representative contact item, the icon indicating a number of subordinate contact items which are subordinate to the representative contact item, and when the icon is selected, the controller displays the subordinate contact items on the display.

7. The mobile terminal of claim 1, wherein the controller generates a group including the representative contact item and subordinate contact items subordinate to the representative contact item, and designates a new representative contact item among contact items included in the generated group based on another touch input applied to the display.

8. The mobile terminal of claim 7, wherein the controller displays an icon corresponding to the generated group on a wall paper, and when a touch input applied to the icon is sensed, the controller displays at least one of contact information corresponding to the new representative contact item or contact information corresponding to one or more of the subordinate contact items on the display based on an attribute of the touch input applied to the icon.

9. The mobile terminal of claim 1, wherein the controller extracts contact items from the plurality of contact items by using contact information corresponding to the representative contact item, displays the extracted contact items on the display, and designates a contact item selected from among the extracted contact items as another subordinate contact item with respect to the representative contact item.

10. The mobile terminal of claim 9, wherein when a touch input with respect to the representative contact item is sensed, the controller displays a pop-up window including the extracted contact items on the display.

11. The mobile terminal of claim 10, further including:

a detector configured to detect a representative face image from image information corresponding to the representative contact item, and detect face images from image information corresponding to each of the plurality of contact items, wherein the controller compares the detected representative face image and the face images to extract, from the plurality of contact items, a contact item having a face image corresponding to the representative face image.

12. The mobile terminal of claim 1, wherein the controller divides the plurality of contact items into a plurality of groups by using contact information corresponding to each of the plurality of contact items, and discriminately displays the plurality of groups on the display.

13. The mobile terminal of claim 12, wherein when any one of contact items included in a group among the plurality of groups is selected, the controller designates the selected contact item as a representative contact item for the group, and after the representative contact item is designated for the group, when a different contact item is selected from among contact items included in the group, the controller designates the selected different contact item as a subordinate contact item with respect to the representative item for the group.

14. The mobile terminal of claim 12, wherein when a touch input applied to one of the contact items included in one of the groups is sensed, the controller detects an attribute of the sensed touch input and designates, based on the attribute, the contact item as one of a representative contact item for the group or a subordinate contact item for the group.

15. The mobile terminal of claim 1, wherein when a control command for adding a new contact item is received, the controller extracts contact items, from the plurality of contact items, associated with contact information that corresponds to contact information for the new contact item, and displays the extracted contact items on the display.

16. The mobile terminal of claim 15, wherein when one of the extracted contact items is selected, the controller merges the contact information for the new contact item with the contact information for the selected contact item.

17. The mobile terminal of claim 1, wherein the first contact list is sorted according to at least one of a usage frequency order, a most recently used order, or an alphabetic order.

18. A control method of a mobile terminal including a display, the method comprising:

displaying a first contact list that includes a plurality of contact items arranged along a particular direction, the plurality of contact items including a first contact item and a second contact item;

receiving an input selecting the first contact item;

designating the first contact item as a representative contact item based on receiving the input;

dividing the display into a first screen region and a second screen region based on designating the first contact item as the representative contact;

displaying information associated with the representative contact item in the first screen region and the first contact list in the second screen region;

scrolling the second screen region based on a drag input applied into the second screen region along the particular direction, wherein the information associated with the representative contact item is continuously displayed in the first screen region while the second screen region is scrolled;

receiving another input selecting the second contact item within the second screen region;

designating, based on the other touch input, the second contact item as a subordinate contact item linked to the representative contact item; and displaying, based on designating the second contact item as the subordinate contact item, a second contact list that excludes the second contact item.

19. The method of claim 18, further comprising:

displaying a bar that devices the first and second screen regions, wherein the first screen region is upsized and the second screen region is downsized simultaneously when the bar is moved toward the second screen region.

20. The method of claim 18, wherein the first contact list is sorted according to at least one of a usage frequency order, a most recently used order, or an alphabetic order.

\* \* \* \* \*